US012792621B2

(12) United States Patent
Tschetter et al.

(10) Patent No.: US 12,792,621 B2
(45) Date of Patent: *Nov. 10, 2026

(54) ITERATIVE QUERYING MECHANISM FOR DATA AGGREGATION AND VISUALIZATION

(71) Applicant: Imply Data, Inc., Burlingame, CA (US)

(72) Inventors: Eric Tschetter, Tokyo (JP); Vadim Ogievetsky, San Francisco, CA (US)

(73) Assignee: Imply Data, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,228

(22) Filed: Jan. 16, 2025

(65) Prior Publication Data

US 2025/0156431 A1 May 15, 2025

Related U.S. Application Data

(63) Continuation of application No. 17/959,201, filed on Oct. 3, 2022, now Pat. No. 12,229,155.

(60) Provisional application No. 63/251,206, filed on Oct. 1, 2021.

(51) Int. Cl.
*G06F 16/2458* (2019.01)

(52) U.S. Cl.
CPC ................................ *G06F 16/2471* (2019.01)

(58) Field of Classification Search
CPC ..... G06F 16/2471; G06F 16/287; G06F 16/26
USPC .......................................................... 707/770
See application file for complete search history.

(56) References Cited

U.S. PATENT DOCUMENTS

| | | | | |
|---|---|---|---|---|
| 9,836,183 | B1 | 12/2017 | Love | |
| 11,675,766 | B1 | 6/2023 | Chen | |
| 2012/0158933 | A1 | 6/2012 | Shetty | |
| 2015/0363465 | A1 | 12/2015 | Bordawekar | |
| 2016/0359872 | A1 | 12/2016 | Yadav | |
| 2017/0323028 | A1* | 11/2017 | Jonker | G06F 16/9024 |
| 2018/0129401 | A1 | 5/2018 | Kim | |
| 2020/0357483 | A1 | 11/2020 | Roquet | |

(Continued)

OTHER PUBLICATIONS

Wang et al. The English Translation of CN112925952A. Jun. 8, 2021. https://patents.google.com/patent/CN112925952A/en?oq=CN112925952 (Year: 2021).*

(Continued)

*Primary Examiner* — Kimberly L Wilson
(74) *Attorney, Agent, or Firm* — Patent Law Works

(57) ABSTRACT

A system and method for implementing an iterative query mechanism to facilitate distributed aggregation and interactive visualization of data is disclosed. At least, the method includes receiving user interaction in association with rendering a visualization of hierarchical data, determining a query based on the user interaction, distributing the query in parallel to a cluster of computing devices, wherein each computing device in the cluster locally generates and prunes a tree based on processing the query, receiving a plurality of trees from the cluster of computing devices responsive to distributing the query, merging the plurality of trees into an aggregated tree, and rendering the visualization of hierarchical data based on the aggregated tree.

20 Claims, 9 Drawing Sheets

(56) References Cited

U.S. PATENT DOCUMENTS

2021/0005164 A1 1/2021 Hayashi

OTHER PUBLICATIONS

Beheshti et al. "Scalable Graph-Based OLAP Analytics over Process Execution Data." Distributed and Parallel Databases, vol. 34, No. 3, Jan. 6, 2015, pp. 379-423, doi:10.1007/s10619-014-7171-9.

Extended European Search Report; Application No. EP22877435 Imply Data, Inc., Filing date of Oct. 3, 2022, date of mailing Jun. 11, 2025, 9 pages.

PCT International Search Report and Written Opinion; Application No. PCT/US2022/045575 Imply Data Inc., International filing date of Oct. 3, 2022, date of mailing Feb. 7, 2023, 15 pages.

* cited by examiner

ITERATIVE QUERYING MECHANISM FOR DATA AGGREGATION AND VISUALIZATION

CROSS-REFERENCE TO RELATED APPLICATIONS

The present application is a continuation of U.S. patent application Ser. No. 17/959,201, filed Oct. 3, 2022, and titled "Iterative Querying Mechanism for Data Aggregation and Visualization," which claims priority, under 35 U.S.C. § 119, of U.S. Provisional Patent Application No. 63/251,206, filed Oct. 1, 2021, and entitled "Iterative Querying Mechanism for Data Aggregation and Visualization," which is incorporated by reference in its entirety.

BACKGROUND

The specification generally relates to implementing an iterative query mechanism for data aggregation and visualization. In particular, the specification relates to a system and method for implementing an iterative query mechanism to facilitate distributed aggregation and interactive visualization of data.

Business users explore and investigate large datasets including analytical data for insight that may impact day-to-day and long-range decision making. Oftentimes, data queries made by such business users, such as online analytical processing (OLAP) based queries, return thousands of rows of data in real-time data analytics. However, data visualization and user interaction with large results of such queries is problematic and limited. For example, a visualization of a tree with 80,000 root nodes and millions of child nodes would be imperceptible to a business user on a normal sized display screen. As such, there is a persistent need for a query mechanism that aggregates useful data for many types of event-driven and streaming data flows for interactive and intuitive visualization.

This background description provided herein is for the purpose of generally presenting the context of the disclosure.

SUMMARY

The techniques introduced herein overcome the deficiencies and limitations of the prior art, at least in part, with a system and method for implementing an iterative query mechanism to facilitate distributed aggregation and interactive visualization of data.

According to one innovative aspect of the subject matter described in this disclosure, a method includes: receiving user interaction in association with rendering a visualization of hierarchical data, determining a query based on the user interaction, distributing the query in parallel to a cluster of computing devices, wherein each computing device in the cluster locally generates and prunes a tree based on processing the query, receiving a plurality of trees from the cluster of computing devices responsive to distributing the query, merging the plurality of trees into an aggregated tree, and rendering the visualization of hierarchical data based on the aggregated tree.

According to another innovative aspect of the subject matter described in this disclosure, a system includes: one or more processors; a memory storing instructions, which when executed cause the one or more processors to: receive user interaction in association with rendering a visualization of hierarchical data, determine a query based on the user interaction, distributing the query in parallel to a cluster of computing devices, wherein each computing device in the cluster locally generates and prunes a tree based on processing the query, receive a plurality of trees from the cluster of computing devices responsive to distributing the query, merge the plurality of trees into an aggregated tree, and render the visualization of hierarchical data based on the aggregated tree.

These and other implementations may each optionally include one or more of the following features. For instance, the features may include distributing the query in parallel to the cluster of computing devices comprising determining a first set of criteria in association with the query, identifying one or more data segments in association with a database storing the hierarchical data that match the first set of criteria, identifying the cluster of computing devices serving the one or more data segments for processing the query, and distributing the query in parallel to the identified cluster of computing devices. For instance, the features may further include each computing device in the cluster locally generates and prunes the tree based on processing the query by determining a second set of criteria in association with the query, scanning data from the one or more data segments that match the second set of criteria, adding a path to the tree based on the scanned data, the path having a level of depth and hierarchically linking a parent node to a child node in the tree, identifying, from the second set of criteria, a first configuration parameter specifying a prune limit and a second configuration parameter specifying a prune target in association with pruning the tree, determining whether a current number of nodes in the tree satisfy the first configuration parameter specifying the prune limit responsive to adding the path to the tree based on the scanned data, and pruning down the current number of nodes in the tree to satisfy the second configuration parameter specifying the prune target responsive to determining that the current number of nodes in the tree satisfy the first configuration parameter specifying the prune limit. For instance, the features may further include pruning down the current number of nodes in the tree to satisfy the second configuration parameter specifying the prune target comprising sorting the current number of nodes by their corresponding weight and level of depth in the tree, identifying a child node that is lowest in weight and deepest in level of depth in the tree, pruning the child node from the tree by rolling a weight of the child node into a catchall bucket of its corresponding parent node, and repeating the sorting, the identifying, and the pruning until the current number of nodes in the tree satisfy the second configuration parameter specifying the prune target. For instance, the features may further include merging the plurality of trees into the aggregated tree comprising receiving, from a first computing device of the cluster of computing devices, a first tree, receiving, from a second computing device of the cluster of computing devices, a second tree, performing a traversal of the first tree and the second tree starting from a corresponding root node, determining whether there are corresponding nodes in the first tree and the second tree having a same name responsive to performing the traversal of the first tree and the second tree from the corresponding root node, merging the corresponding nodes and adding up their corresponding weights in the aggregated tree responsive to determining that there are corresponding nodes in the first tree and the second tree having the same name, determining whether there is a child node present in the first tree that is absent from a corresponding parent node in the second tree responsive to determining that there is an absence of corresponding nodes in the first tree and the second tree having the same name, determining whether a catchall bucket of the corresponding parent node in the second tree is non-empty responsive to determining that there is the child node present in the first tree that is absent from the corresponding parent node in the second tree, merging the corresponding parent node and rolling a weight of the child node from the first tree into the catchall bucket of the corresponding parent node in the aggregated tree responsive to determining that the catchall bucket of the corresponding parent node in the second tree is non-empty, and merging the corresponding parent node and adding the child node from the first tree to the corresponding parent node in the aggregated tree responsive to determining that the catchall bucket of the corresponding parent node in the second tree is empty. For instance, the features may further include receiving the user interaction in association with rendering the visualization of hierarchical data including receiving, in the visualization, a selection of a graphical element corresponding to one of a node and a catchall bucket. For instance, the features may further include rendering the visualization of hierarchical data based on the aggregated tree comprising automatically selecting a threshold number of nodes without user interaction, determining a query in association with automatically selecting each node in the threshold number of nodes, and distributing the query in parallel to the cluster of computing devices for processing. For instance, the features may further include the aggregated tree being a multi-rooted tree and the visualization being one from a group of a flame graph, a flame chart, an icicle chart, and a sunburst layout.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
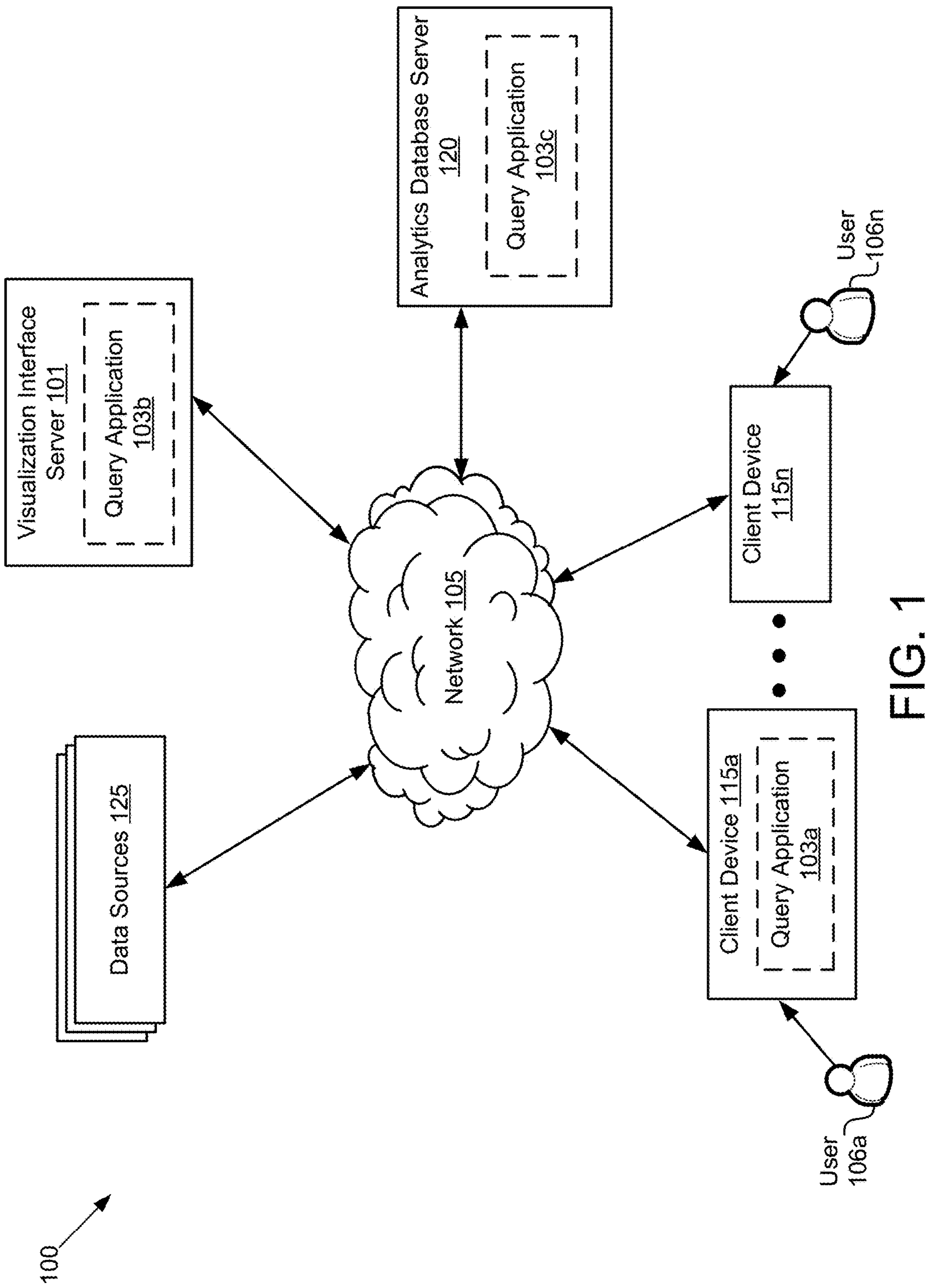
FIG. 1 is a high-level block diagram illustrating one implementation of an example system for implementing an iterative query mechanism to facilitate distributed aggregation and interactive visualization of data.

FIG. 1 is a high-level block diagram illustrating one implementation of an example system 100 for implementing an iterative query mechanism to facilitate distributed aggregation and interactive visualization of data. The illustrated system 100 may have one or more client devices 115*a* . . . 115*n* that can be accessed by users 106*a* . . . 106*n*, a visualization interface server 101, an analytics database server 120, and a plurality of data sources 125. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105 for interaction and electronic communication with one another. While one implementation of the functionality of the system 100 is described below with reference to the client-server architecture shown in FIG. 1, it should be understood that the functionality of the system 100 may be implemented in other architectures. For example, in some implementations, the system 100 may be configured on a single computer (or virtual machine) coupled to the network 105 to provide a loopback communication using Transmission Control Protocol (TCP) or sockets.

The network 105 may be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 105 may include packetized data (e.g., Internet Protocol (IP) data packets) that is routed to designated computing devices coupled to the network 105. Although FIG. 1 illustrates one network 105 coupled to the client devices 115, the visualization interface server 101, the analytics database server 120, and the plurality of data sources 125, in practice one or more networks 105 can be connected to these entities.

The client devices 115*a* . . . 115*n* (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115*a* . . . 115*n* may couple to and communicate with one another and the other entities of the system 100 via the network 105 using a wireless and/or wired connection. Examples of client devices 115 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 105.

In the example of FIG. 1, the client device 115*a* is configured to implement a query application 103*a* described in more detail below. The client device 115 includes a display for viewing information provided by one or more entities coupled to the network 105. For example, the client device 115 may be adapted to send and receive data to and from one or more of the visualization interface server 101, the data sources 125, and the analytics database server 120. While FIG. 1 illustrates two client devices 115*a* and 115*n*, the disclosure applies to a system architecture including any number of client devices 115. In addition, the client devices 115*a* . . . 115*n* may be the same or different types of computing devices. The client devices 115*a* . . . 115*n* may be associated with the users 106*a* . . . 106*n*. For example, users 106*a* . . . 106*n* may be authorized personnel including data managers, data analysts, admins, end users, engineers, technicians, administrative staff, etc. of a business organization. In some implementations, the client device 115 may run a user application. The user application may include web, mobile, enterprise, and cloud application. For example, the client device 115 may include a web browser that may run JavaScript or other code to allow authorized personnel to access the functionality provided by other entities of the system 100 coupled to the network 105. In some implementations, the client device 115 may be implemented as a computing device 200 as will be described below with reference to FIG. 2.

In the example of FIG. 1, the system 100 may include a visualization interface server 101, a plurality of data sources 125, and an analytics database server 120 coupled to the network 105. The entities 101, 120, and 125 may be, or may be implemented by, a computing device including a processor, a memory, applications, a database, and network communication capabilities similar to that described below with reference to FIG. 2.

In some implementations, each one of the entities 101, 120, and 125 of the system 100 may be a hardware server, a software server, or a combination of software and hardware. For example, the visualization interface server 101 may include one or more hardware servers, virtual servers, server arrays, storage devices and/or systems, etc., and/or may be centralized or distributed/cloud-based. In some implementations, each one of the entities 101, 120, and 125 of the system 100 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, each one of the entities 101, 120, and 125 of the system 100 may be a Hypertext Transfer Protocol (HTTP) server, a Representational State Transfer (REST) service, or other server type, having structure and/or functionality for processing and satisfying content requests and/or receiving content from the other entities 101, 120, and 125 and one or more of the client devices 115 coupled to the network 105. Also, instead of or in addition, each one of the entities 101, 120, and 125 of the system 100 may implement its own application programming interface (API) for facilitating access and the transmission of instructions, data, results, and other information to other one of the entities 101, 120, and 125 communicatively coupled to the network 105.

In the example of FIG. 1, the components of the visualization interface server 101 may be configured to implement a query application 103*b* described in more detail below. In some implementations, the visualization interface server 101 may provide a service for facilitating online analytical processing (OLAP), such as data analysis, data exploration, and visualization of large datasets. For example, the visualization interface server 101 enables a data manager to create a data cube associated with a datasource and set permissions for an end user to access the data cube. Data managers embed their knowledge into data cubes by creating a variety of dimensions and measures. A data cube is the basic unit of representation of data used for visualization. An end user may interact with a view of the data cube by selecting the data cube in the user interface. The end user may freely explore the data across available dimensions and measures. The data cubes may also include the key performance indicators (KPIs) that the end user is interested in encoded as measures. It should be understood that the visualization interface server 101 is not limited to providing the above-noted acts and/or functionality and may include other network-accessible services.

In some implementations, the visualization interface server 101 may be configured to send and receive data and analytics to and from other entities of the system 100 via the network 105. For example, the visualization interface server 101 sends and receives data including instructions to and from the client device 115. In some implementations, the visualization interface server 101 may serve as a middle layer and permit interactions between the client device 115 and each of the analytics database server 120 and the plurality of data sources 125 to flow through and from the visualization interface server 101. In some implementations, the visualization interface server 101 may use a set of query tools including a query planner and a custom query language to make expressions for querying and interacting with big data in the analytics database server 120. In some implementations, the visualization interface server 101 may also include database (not shown) coupled to it (e.g., over the network 105) to store structured data in a relational database and a file system (e.g., HDFS, NFS, etc.) for unstructured or semi-structured data. In some implementations, the visualization interface server 101 may include an instance of a data storage 243 that stores various types of data for access and/or retrieval by the query application 103*b*. Although only a single visualization interface server 101 is shown in FIG. 1, it should be understood that there may be any number of visualization interface servers 101 or a server cluster. It should be understood that the visualization interface server 101 may be representative of a data analytics service provider and there may be multiple data analytics service providers coupled to the network 105, each having its own server or a server cluster, applications, application programming interface, etc.

In the example of FIG. 1, the system 100 may include a plurality of data sources 125. The plurality of data sources 125 may communicate with one or more entities of the system 100, such as the analytics database server 120 and the visualization interface server 101. The plurality of data sources 125 may include a data warehouse, a system of record (SOR), or belonging to a data repository owned by an organization that provides real-time or close to real-time data automatically or responsive to being polled or queried by the analytics database server 120 and/or the visualization interface server 101. For example, a data source 125 may be a business-owned server that generates and stores company's raw data (e.g., a data source) which may be ingested by the analytics database server 120. Such raw data may include large, fast-moving, and up-to-date data. Examples of data provided by the plurality of data sources 125 may include, but are not limited to, marketing and advertising campaign data, product and website clickstream data, application performance data, network data, service performance data, supply chain activity data, Internet of Things (IoT) data, etc. In some implementations, a data source 125 may be an application performance management system used by a business that includes one or more program analysis tools (e.g., sampling profilers) to aggregate profiling data of distributed applications deployed by a company.

In the example of FIG. 1, the components of the analytics database server 120 may be configured to implement a query application 103*c* described in more detail below. In some implementations, the analytics database server 120 may be configured to implement an analytics database service (e.g., Apache Druid™) that is configured to receive, store, extract, load, and transform company raw data (e.g., Big data) associated with the plurality of data sources 125 for performing data exploration and visualization in conjunction with the visualization interface server 101 (e.g., Pivot). For example, the analytics database server 120 may be configured as a database backend for powering graphical user interfaces of analytical applications enabled by the visualization interface server 101. In some implementations, the analytics database server 120 and the visualization interface server 101 may be integrated into a single computing device for facilitating OLAP and configured to be deployed on premises of a business. In other implementations, the analytics database server 120 and the visualization interface server 101 may be configured to be located and deployed remotely. The analytics database server 120 may be configured to support one or more structured query language (SQL) dialects. In some implementations, the analytics database server 120 may be configured to stream data from message buses, such as Apache Kafka, Amazon Kinesis, etc. In some implementations, the analytics database server 120 may be configured to ingest data in batch mode by retrieving files from Hadoop Distributed File System (HDFS), Amazon™ Simple Storage Service (S3), or local filesystem sources. For example, a data manager may configure ingestion of data into the analytics database server 120. Data ingestion may include creating or writing into a database or 'datasource' that is queryable. For example, a datasource may include a table datasource, a union datasource, and query datasource. A data source 125 (two words) refers to a source of data that is ingested into the analytics database server 120. In some implementations, the analytics database server 120 may be configured to partition a datasource by attributes, such as time. Each time range may be referred to as a chunk (e.g., a single day, if the datasource is partitioned by day). Within a chunk, data is partitioned further into one or more segments. In other words, the segments may be organized into time chunks. A segment may be a single file comprising millions of rows of data. The analytics database server 120 distributes the data segments of a datasource across a cluster of computing devices.

In some implementations, the analytics database server 120 may also include database (not shown) coupled to it (e.g., over the network 105) to store structured data in a relational database and a file system (e.g., HDFS, NFS, etc.) for unstructured or semi-structured data. In some implementations, the analytics database server 120 may include an instance of a data storage 243 that stores various types of data for access and/or retrieval by the query application 103*c*. Although only a single analytics database server 120 is shown in FIG. 1, it should be understood that there may be any number of independent analytics database servers 120 deployed in a server cluster or distributed over the network 105 as node machines for performing their functionality (e.g., servicing distributed queries).

The query application 103 may include software and/or logic to provide the functionality for implementing an iterative query mechanism to facilitate distributed aggregation and interactive visualization of very large data sets. In some implementations, the query application 103 may be implemented using programmable or specialized hardware, such as a field-programmable gate array (FPGA) or an application-specific integrated circuit (ASIC). In some implementations, the query application 103 may be implemented using a combination of hardware and software. In some implementations, the query application 103 may be stored and executed on a combination of the client devices 115, the analytics database server 120, and the visualization interface server 101, or by any one of the client devices 115, the analytics database server 120, or visualization interface server 101.

Figure 5A:
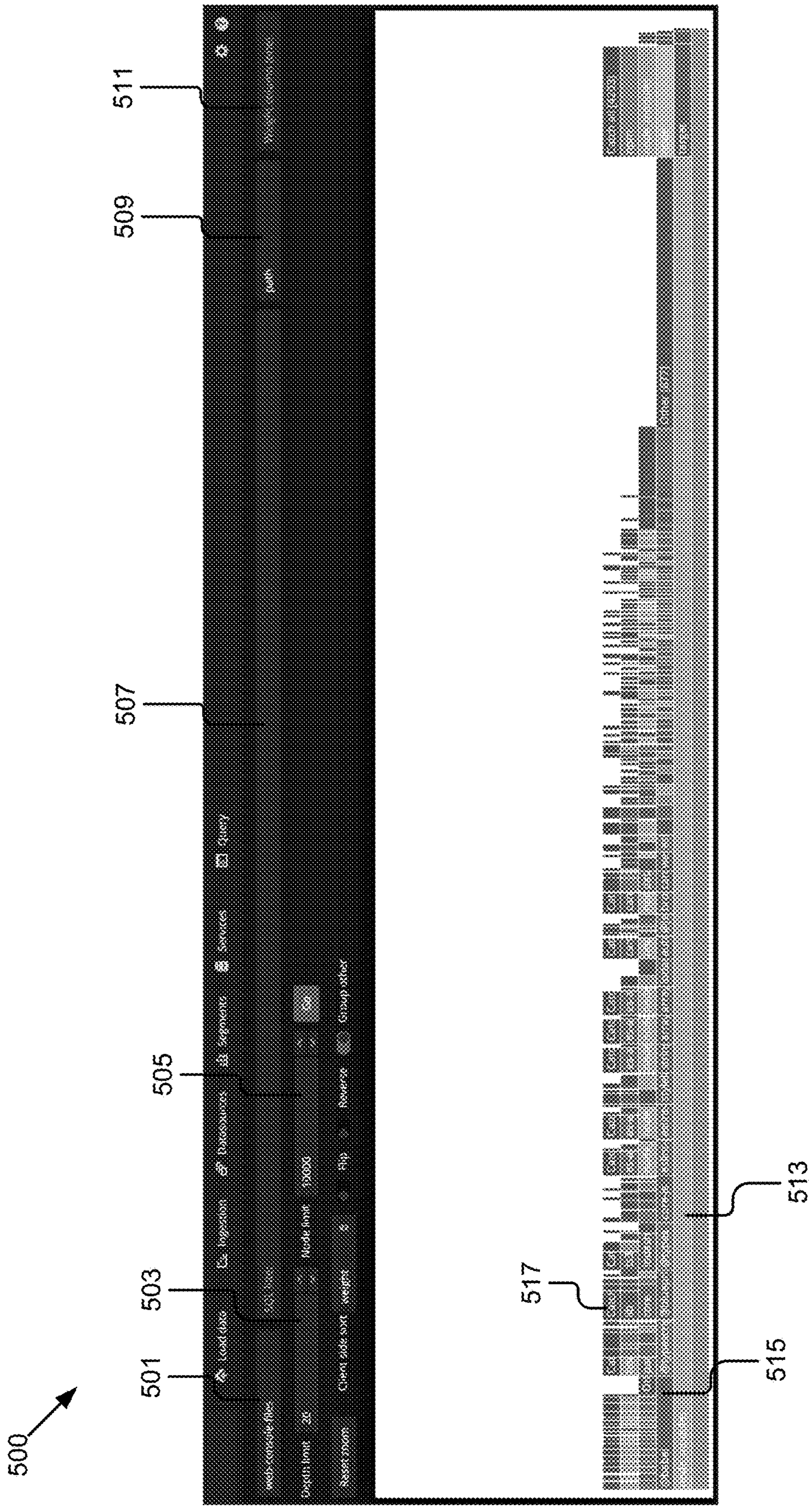
FIGS. 5A-5B show graphical representation of example user interfaces depicting a flame graph visualization for data exploration and analysis.
Figure 5B:
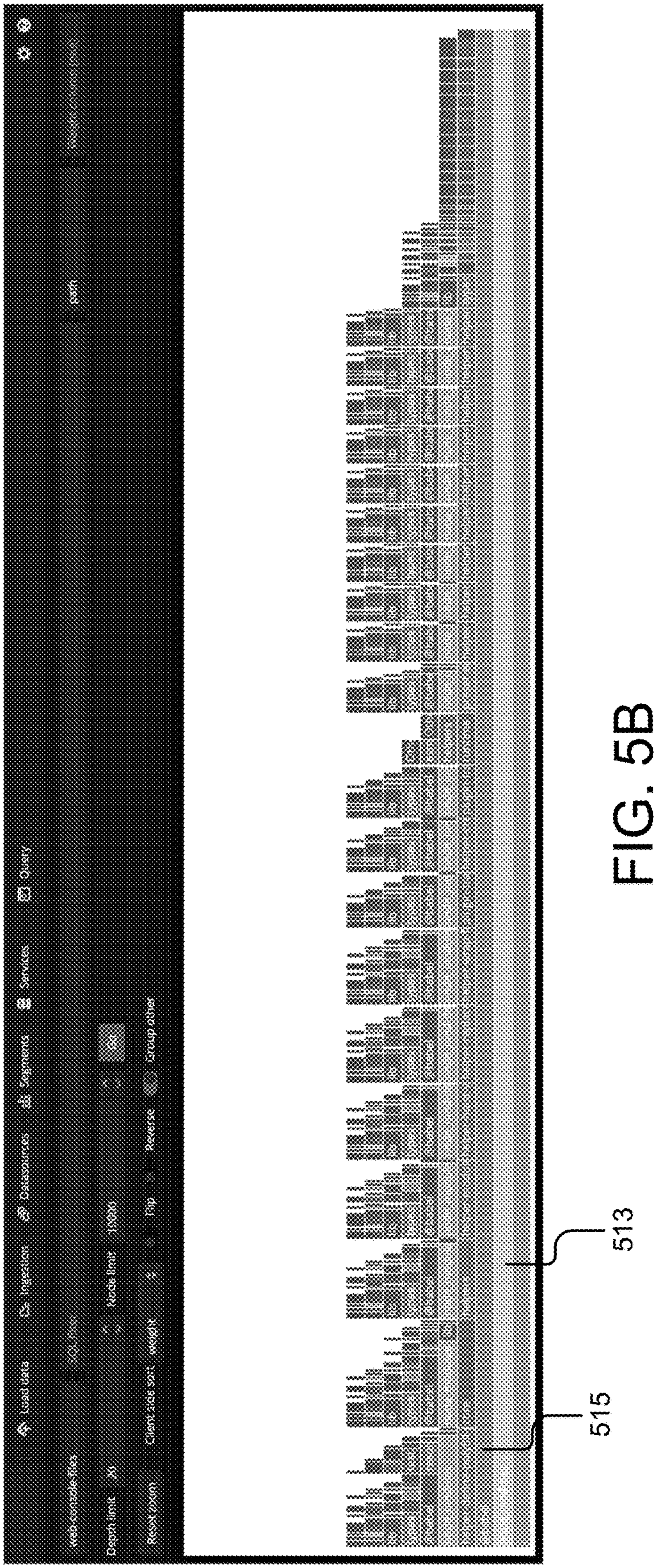

As depicted in FIG. 1, the query application 103*a*, 103*b*, and 103*c* is shown in dotted lines to indicate that the operations performed by the query application 103*a*, 103*b*, and 103*c* as described herein may be performed at the client device 115, the visualization interface server 101, the analytics database server 120, or any combinations of these components. In some implementations, each instance 103*a*, 103*b*, and 103*c* may include one or more components of the query application 103 depicted in FIG. 2, and may be configured to fully or partially perform the functionalities described herein depending on where the instance resides. In some implementations, the query application 103 may be a thin-client application with some functionality executed on the client device 115 and additional functionality executed on the visualization interface server 101 and the analytics database server 120. In some implementations, the query application 103 may generate and present various user interfaces to perform these acts and/or functionality, which may in some cases be based at least in part on information received from the visualization interface server 101, the client device 115, the analytics database server 120, and/or the data sources 125 via the network 105. Non-limiting example user interfaces that may be generated for display by the query application 103 are depicted in FIGS. 5A and 5B.

In some implementations, the query application 103 is code operable in a web browser, a web application accessible via a web browser, a native application (e.g., mobile application, installed application, etc.) on the client device 115, a plug-in or an extension, a combination thereof, etc. Additional structure, acts, and/or functionality of the query application 103 is further discussed below with reference to at least FIG. 2. While the query application 103 is described below as a stand-alone component, in some implementations, the query application 103 may be part of other applications in operation on the client device 115, the visualization interface server 101, and the analytics database server 120. While the examples herein describe one aspect of underlying query mechanism for data analytics, it should be understood that the query application 103 may be configured to facilitate and guide the user from end-to-end, for example, from data ingestion to data visualization.

In some implementations, the query application 103 may require users to be registered with the visualization interface server 101 and/or the analytics database server 120 to access the acts and/or functionality described herein. The query application 103 may require a user to authenticate his/her identity to access various acts and/or functionality provided by the query application 103. For example, the query application 103 may require a user seeking access to authenticate their identity by inputting credentials in an associated user interface. In another example, the query application 103 may interact with a federated identity server (not shown) to register and/or authenticate the user by receiving and verifying biometrics including username and password, facial attributes, fingerprint, and voice.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 101 to a client device 115, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
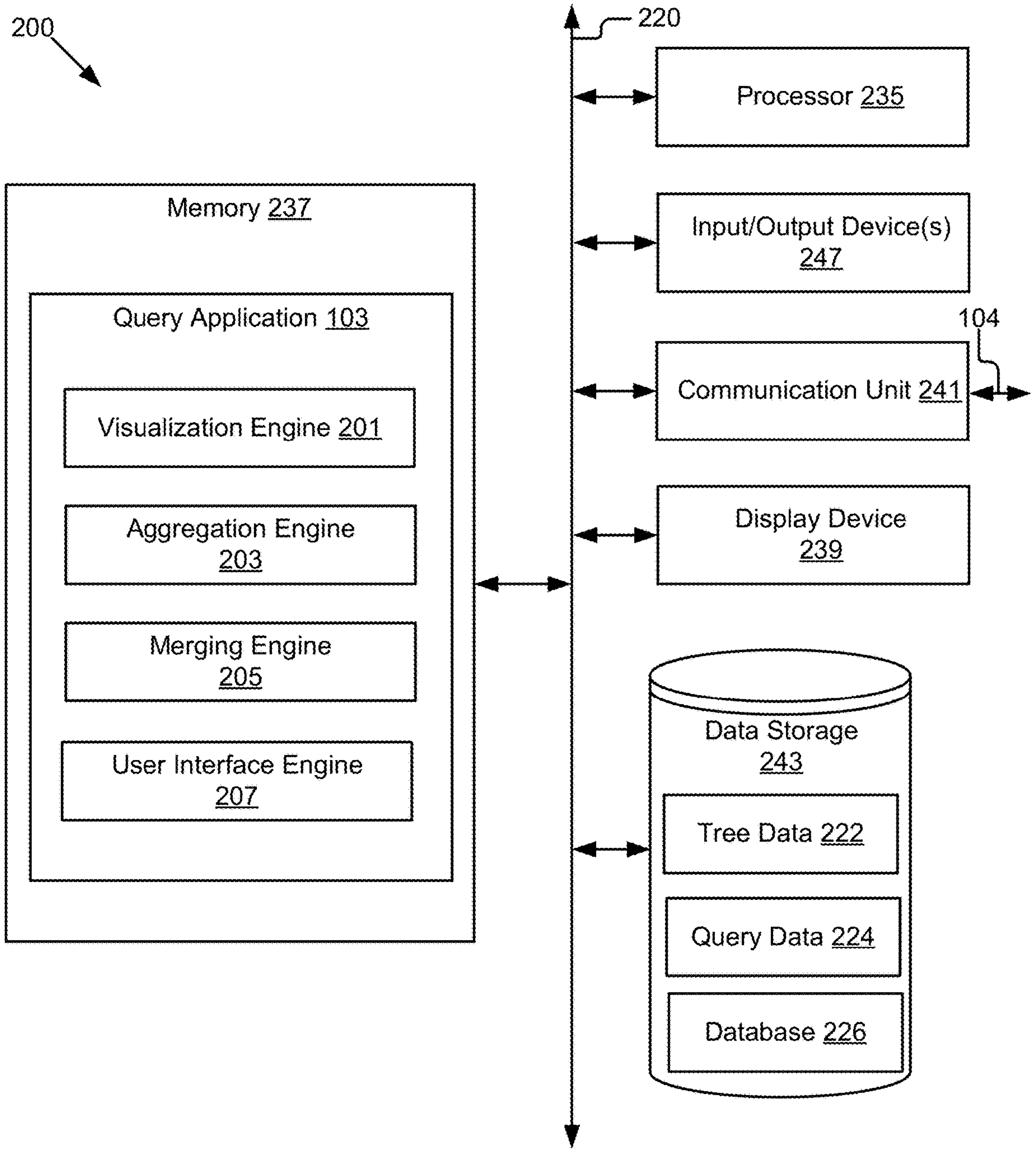
FIG. 2 is a block diagram illustrating one implementation of an example computing device including a query application.

FIG. 2 is a block diagram illustrating one implementation of a computing device 200 including a query application 103. The computing device 200 may also include a processor 235, a memory 237, a display device 239, a communication unit 241, an input/output device(s) 247, and a data storage 243, according to some examples. The components of the computing device 200 are communicatively coupled by a bus 220. In some implementations, the computing device 200 may be the client device 115, the visualization interface server 101, the analytics database server 120 or a combination of the client device 115, the visualization interface server 101, and the analytics database server 120. In such implementations where the computing device 200 is the client device 115, the visualization interface server 101 or the analytics database server 120, it should be understood that it may take other forms and include additional or fewer components without departing from the scope of the present disclosure. For example, while not shown, the computing device 200 may include sensors, capture devices, additional processors, and other physical configurations. Additionally, it should be understood that the computer architecture depicted in FIG. 2 could be applied to other entities of the system 100 with various modifications, including, for example, the data sources 125.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device 239, supporting the display of images, capturing and transmitting images, and performing complex tasks including various types of feature extraction and sampling. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the display device 239, the input/output device(s) 247, the query application 103, and the data storage 243.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, as depicted in FIG. 2, the memory 237 may store the query application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 105 or portions thereof, a processor mesh, a combination thereof, etc. In some implementations, the query application 103 and various other software operating on the computing device 200 (e.g., an operating system, device drivers, etc.) may cooperate and communicate via a software communication mechanism implemented in association with the bus 220. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The display device 239 may be any conventional display device, monitor or screen, including but not limited to, a liquid crystal display (LCD), light emitting diode (LED), organic light-emitting diode (OLED) display or any other similarly equipped display device, screen or monitor. The display device 239 represents any device equipped to display user interfaces, electronic images, and data as described herein. In different embodiments, the display device 230 may output display in binary (only two different values for pixels), monochrome (multiple shades of one color), or multiple colors and shades. The display device 239 is coupled to the bus 220 for communication with the processor 235 and the other components of the computing device 200. In some implementations, the display device 239 may be a touch-screen display device capable of receiving input from one or more fingers of a user. For example, the display device 239 may be a capacitive touch-screen display device capable of detecting and interpreting multiple points of contact with the display surface. In some implementations, the computing device 200 (e.g., client device 115) may include a graphics adapter (not shown) for rendering and outputting the images and data for presentation on display device 239. The graphics adapter (not shown) may be a separate processing device including a separate processor and memory (not shown) or may be integrated with the processor 235 and memory 237.

The input/output (I/O) device(s) 247 may include any standard device for inputting or outputting information and may be coupled to the computing device 200 either directly or through intervening I/O controllers. In some implementations, the I/O device 247 may include one or more peripheral devices. Non-limiting example I/O devices 247 include a touch screen or any other similarly equipped display device equipped to display user interfaces, electronic images, and data as described herein, a touchpad, a keyboard, a scanner, a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the input/output device 247 and the display device 239 may be integrated, and a user of the computing device 200 (e.g., client device 115) may interact with the computing device 200 by contacting a surface of the display device 239 using one or more fingers. For example, the user may interact with an emulated (i.e., virtual or soft) keyboard displayed on the touch-screen display device 239 by using fingers to contact the display in the keyboard regions.

The communication unit 241 is hardware for receiving and transmitting data by linking the processor 235 to the network 105 and other processing systems via signal line 104. The communication unit 241 may receive data such as user input from the client device 115 and transmits the data to the query application 103, for example a user interaction to expand a view of the data on the user interface. The communication unit 241 also transmits information including on-demand data segments to the client device 115 for display, for example, in response to the user interaction. The communication unit 241 is coupled to the bus 220. In some implementations, the communication unit 241 may include a port for direct physical connection to the client device 115 or to another communication channel. For example, the communication unit 241 may include an RJ45 port or similar port for wired communication with the client device 115. In other implementations, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In other implementations, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In yet other implementations, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. In some implementations, the data storage 243 may be coupled to the components 235, 237, 239, 241, and 247 via the bus 220 to receive and provide access to data. In some implementations, the data storage 243 may store data received from other elements of the system 100 including, for example, entities 101, 115, 120, 125, and/or the query applications 110, and may provide data access to these entities. The data storage 243 may store, among other data, tree data 222, query data 224, and datasource or database 226. The data storage 243 stores data associated with implementing an iterative query mechanism to facilitate distributed aggregation and interactive visualization of data and other functionality as described herein. The data stored in the data storage 243 is described below in more detail.

The data storage 243 may be included in the computing device 200 or in another computing device and/or storage system distinct from but coupled to or accessible by the computing device 200. The data storage 243 may include one or more non-transitory computer-readable mediums for storing the data. In some implementations, the data storage 243 may be incorporated with the memory 237 or may be distinct therefrom. The data storage 243 may be a dynamic random-access memory (DRAM) device, a static random-access memory (SRAM) device, flash memory, or some other memory devices. In some implementations, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In some implementations, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

It should be understood that other processors, operating systems, sensors, displays, and physical configurations are possible.

As depicted in FIG. 2, the memory 237 may include the query application 103. In some implementations, the query application 103 may include a visualization engine 201, an aggregation engine 203, a merging engine 205, and a user interface engine 207. The components of the query application 103 may each include software and/or logic to provide their respective functionality. In some implementations, the components of the query application 103 may each be implemented using programmable or specialized hardware including a field-programmable gate array (FPGA) or an application-specific integrated circuit (ASIC). In some implementations, the components of the query application 103 may each be implemented using a combination of hardware and software executable by the processor 235. In some implementations, the components of the query application 103 may each be sets of instructions stored in the memory 237 and configured to be accessible and executable by the processor 235 to provide their acts and/or functionality. In some implementations, the components of the query application 103 may each be adapted for cooperation and communication with the processor 235, the memory 237, and other components of the computing device 200 via the bus 220. In some implementations, the components of the query application 103 may send and receive data, via the communication unit 241, to and from one or more of the client devices 115, the visualization interface server 101, the analytics database server 120, and data sources 125.

The visualization engine 201 may include software and/or logic to provide the functionality for facilitating a visualization and analysis of large datasets, such as big data. The visualization engine 201 sends instructions to the user interface engine 207 to generate a user interface for providing an interactive exploration of hierarchical data. For example, the hierarchical data may include profiling data, such as exception stack traces, execution stack traces, clickstream or customer journey analysis data relating to a customer flow through an experience, etc. In some implementations, such profiling data may be generated by one or more program analysis tools. An example program analysis tool is a sampling profiler that inspects a running program or application by taking snapshots or samples of the running program's method call stack at regular intervals (e.g., sampling frequency) and reporting where (e.g., in which function or method or line of code) most of the execution time is spent to identify bottlenecks (e.g., slower parts) in the program and a number of times a method call or routine was found executed (e.g., counts) during the run. The collected samples may be combined together into a tree for use in a visualization.

In some implementations, the visualization engine 201 may configure the analytics database server 120 implementing a data store (e.g., Apache Druid™) to ingest the hierarchical data one-path-at-a-time using an array type from an entity (e.g., data source 125 in FIG. 1) coupled to the network 105. A path may be defined as an ordered list of items. The visualization engine 201 may instruct the aggregation engine 203 (described in detail below) to aggregate paths into a multi-rooted tree. A tree may include varied paths that get aggregated together. The visualization engine 201 uses the tree for generating a visualization. In one example, the tree may be used to generate a flame graph visualization. A flame graph visualization involving stack samples visualizes a trace (a stream of recorded events) of service or method calls and represents each service call that occurred during the request's execution path with a color-coded, horizontal bar. In some implementations, the visualization engine 201 may configure the analytics database server 120 to ingest partially aggregated trees from an entity (e.g., client device 115 in FIG. 1) coupled to the network 105.

Using exception stack traces as an example, a sample of a stack trace may look as shown below:

```
java.lang.RuntimeException: Unable to deduce type of thread from address 0x00007f2
at sun.jvm.hotspot.runtime.Threads.createJavaThreadWrapper(Threads.java:169)
at
sun.jvm.hotspot.runtime.Threads.first(Threads.java:153)
at
sun.jvm.hotspot.runtime.DeadlockDetector.createThreadTable(DeadlockDetector.java:42)
at
sun.jvm.hotspot.runtime.DeadlockDetector.print(DeadlockDetector.java:56)
at
sun.jvm.hotspot.runtime.DeadlockDetector.print(DeadlockDetector.java:39)
```

The stack trace is a trace of method calls in the call stack at a certain point in time with each element representing a method invocation. The topmost element indicates where the exception was thrown and the ordered method invocations leading up to that point are provided underneath it. The visualization engine 201 may decompose the above stack trace sample into the following event for data ingestion:

```
{
"message": "java.lang.RuntimeException: Unable to deduce type of thread from address
0x00007f2",
"stack": [
  "java.lang.RuntimeException",
"sun.jvm.hotspot.runtime.Threads.createJavaThreadWrapper(Threads.java:169)"
"sun.jvm.hotspot.runtime.Threads.first(Threads.java:153)"
"sun.jvm.hotspot.runtime.DeadlockDetector.createThreadTable(DeadlockDetector.java:42)"
"sun.jvm.hotspot.runtime.DeadlockDetector.print(DeadlockDetector.java:56)"
"sun.jvm.hotspot.runtime.DeadlockDetector.print(DeadlockDetector.java:39)"
  ],
  "count": 1
}
```

The "stack" field in the above event represents the path. The "count" field in the above event represents a weight of this path. The visualization engine 201 configures the analytics database server 120 to ingest the hierarchical data one-path-at-a-time using an array type and stores them in the database 226 of the data storage 243. For example, the database 226 may be a table that is queryable.

In some implementations, the visualization engine 201 may instruct the aggregation engine 203 (described in detail below) and the merging engine 205 (described in detail below) to aggregate the hierarchical data from the database 226 into a tree for use in a visualization. The visualization engine 201 receives the hierarchical data aggregated into a tree, converts the tree into a visualization of choice, and renders the visualization. Example visualizations of the hierarchical data may include, but are not limited to, a flame graph, a flame chart, a process flow diagram, an icicle chart, a sunburst layout, or any other visualization built to display graph data. In the above stack trace example, a flame graph visualization may be used to visualize the primary source of errors from an application program to enable engineering teams to understand and prioritize the rate of occurrence of specific source of errors. In another example, a flame graph visualization of profiled execution stack traces may have profiling use cases, such as identifying hot code-paths. In yet another example, a flame graph visualization of clickstream/customer journey analysis data may help with understanding the flow of customers through an experience.

In some implementations, the visualization engine 201 may receive a user interaction in association with rendering the visualization. The visualization engine 201 receives user interactions in the visualization of the aggregated tree and tracks the changes to the view of the data resulting from the user interactions. The visualization engine 201 in cooperation with the user interface engine 207 sets up the user interface for interacting with the visualization. Example user interactions received in the user interface displaying the visualization on a client device 115 may include, but are not limited to, point-and-click, drag-and-drop, one-click, double-click, scroll, resize, expand, collapse, etc. The visualization engine 201 may generate the visualization of the hierarchical data for the user to interact directly with a view of the aggregated data by selecting corresponding graphical elements in the visualization on the user interface. For example, the graphical elements may correspond to selecting a path in the aggregated tree in terms of filtering and/or splitting the hierarchical data to iteratively drill-down and analyze the data in the visualization. The visualization engine 201 may configure the visualization to render a subset of the tree that is useful at any point in time.

The visualization engine 201 exposes an iterative approach that allows for interactive exploration and expansion of the tree in the visualization instead of aggregating the entire tree at once. For example, the visualization engine 201 facilitates rendering a partial tree and receiving user interactions (e.g., click to expand) to iteratively build the tree instead of building all of it from the beginning. This feature of the visualization as described herein to facilitate iterative drill-down and analysis of data provides a framework for a lossless exploration of the aggregated tree. In contrast, existing techniques for visualizing a tree provide a framework for a lossy exploration of the tree because they typically attempt to guess the paths of the tree that are important ahead of time. However, this leads to some potentially important paths of the tree being unavailable for user traversal and interaction during the data visualization.

In some implementations, the visualization engine 201 determines a query based on receiving the user interaction in the visualization. For example, the visualization engine 201 uses the series of user interactions in the visualization to iteratively issue queries with a more and more refined filter set for aggregating a tree. For each iterative refinement and filtering, the visualization engine 201 may issue a query that fetches less data than the previous query (e.g., less processing) and returns a corresponding aggregated tree at a much faster rate. The visualization engine 201 sends the query to the aggregation engine 203 and/or the merging engine 205 for processing. In some implementations, the query may include a first set of criteria and a second set of criteria. The sets of criteria in the query are associated with aggregating the hierarchical data into a tree for visualization. The first set of criteria may be associated with identifying one or more data segments pertaining to the query. For example, the first set of criteria may include a query type, a datasource (e.g., defining the database to query), intervals (e.g., defining time ranges to run the query over), filter (e.g., defining rows of data to include in the computation of the query), context (e.g., specifying a certain flag), virtual columns, etc. The second set of criteria may be associated with identifying the hierarchical data from the data segments for aggregating into a tree and configuring the way the aggregation is to be performed. For example, the second set of criteria may include a path column, a weight column, a configuration object, prefixes, etc. The path column is the column including the array-structured hierarchical data. In the above example of the exception stack trace event, path column may be the 'stack'. The weight column is the column including the weight of the paths. In the above example of exception stack trace event, weight column may be the 'count'. The prefixes may be an array of path prefixes expected to match in the query. Each prefix may also be an array. The configuration object may be a JavaScript Object Notation (JSON) object that represents various configuration parameters providing limiting behaviors on the tree aggregation. The visualization engine 201 stores the sets of criteria for a query in the query data 224 of the data storage 243.

The aggregation engine 203 may include software and/or logic to provide the functionality for managing the aggregation of paths in a tree. The aggregation engine 203 receives the query from the visualization engine 201. The aggregation engine 203 processes the query and aggregates data into the tree in response to processing the query.

One existing method to aggregate a tree for querying the data is in a centralized manner on a single computational node. This method has limitations in terms of size and space complexity as it builds a full, complete tree based on the ingested data. Such an aggregation into a tree might quickly become complex leading to memory pressure and out of memory (OOM) problems on the computational node. For example, 80,000 root nodes in a tree aggregation may result in millions upon millions of child nodes. After the full tree has been aggregated, it is straightforward to prune the tree to the most important branches because all of the counts or weights for the paths in the tree are correct and no new paths will be added. However, aggregating a full tree on a large dataset is time consuming.

Another existing method to aggregate a tree for querying is expanding all the paths in the tree into all of their subsequent sub-paths, aggregating all the expanded paths together, and then taking the top N of the expanded paths for use in rendering a visualization. In other words, each path of a tree may be thought of as a row in a database. With millions of child nodes in the tree, the database may contain tens of millions of rows. This method may sort these rows using a metric and take, for example, the top 50,000 rows to use for rendering the visualization. This method only works under the assumption that each of the 50,000 rows are fully aggregated in terms of the metric that is used to sort and rank the rows. This method has limitations because it requires exploding all of the paths increasing the size of the data managed by the average depth of the paths. Additionally, taking the top N of the paths in this way does not provide any hints into what paths might exist but were not included in the result.

The aggregation engine 203 partially aggregates data into trees in a distributed manner across a cluster of computing devices or node machines (e.g., Java Virtual Machine (JVM)) coupled to the network 105. In some implementations, the cluster of computing devices may be deployed by the analytics database server 120. The aggregation engine 203 parses the query to determine the first set of criteria. The aggregation engine 203 identifies one or more data segments that include data pertaining to the query. For example, the aggregation engine 203 identifies rows of one or more data segments matching the first set of criteria. The aggregation engine 203 identifies the cluster of computing devices (e.g., servers or nodes) serving the identified data segments pertaining to the query. The aggregation engine 203 distributes the query in parallel to the identified cluster of computing devices for query processing. Paths can be extremely varied and their aggregation into a tree may create very large trees. The tree aggregation in response to processing the query is locally performed on each computing device in the cluster. Therefore, any attempt to build a full tree ends up limited in terms of how many resources can be provisioned for a single computing device. In some implementations, the aggregation engine 203 receives the partially aggregated trees from the plurality of distributed computing devices in the cluster and cooperates with the merging engine 205 to merge the partially aggregated trees into a final result.

The aggregation engine 203 parses the query to determine the second set of criteria. The aggregation engine 203 scans the data from one or more data segments that match the second set of criteria. For example, the aggregation engine 203 determines the path column and the weight column from the second set of criteria. The aggregation engine 203 identifies rows in the one or more data segments that match the filter specified in the first set of criteria and only accesses the data from the corresponding columns in each of the identified rows. The aggregation engine 203 adds a path to the tree based on the scanned data. The path may hierarchically link a parent node to a child node in the tree. The path may have a level of depth and a numerical weight associated with it in the tree.

The aggregation engine 203 partially aggregates data into a subset of the tree and attempts to build a best representation of the tree under the assumption that it is permitted to query for data multiple times from the database. The fundamental concept that enables this iterative approach is to limit the aggregation by depth of the tree and then use the 'prefixes' field in the second set of criteria of the query for filtering the data. For example, the aggregation engine 203 executes a query with some space constraints to produce a tree which is then rendered to the user by the visualization engine 201. The user may select a specific path or paths in the visualization of the rendered tree. The visualization engine 201 issues one or more subsequent queries that start from those selected paths and allows for iterative, incremental building of the tree structure. These subsequent queries may add values to the 'prefixes' field in the query. An example 'prefixes' field in the query may be as shown below.

```
"prefixes": [
 ["java.lang.RuntimeException",
"sun.jvm.hotspot.runtime.Threads.createJavaThreadWrapper(Threads.java:169)
 ]
```

The above prefix in the query may cause the aggregation engine 203 to include the path in the tree from the "stack" field in the above example of the exception stack trace event. In some implementations, multiple prefixes may be added to the query as shown below since the 'prefixes' field is a 2-dimensional array. The aggregation engine 203 treats the below prefixes included in the query as an OR operation and matches and includes either prefix.

```
"prefixes": [
 ["java.lang.RuntimeException",
"sun.jvm.hotspot.runtime.Threads.createJavaThreadWrapper(Threads.java:169)
 ["java.lang.RuntimeException",
"io.domain.package.SomeClass(SomeClass.java:27)"]
 ]
```

The aggregation engine 203 determines the configuration object from the second set of criteria in the query. The configuration object includes a grouping of configuration parameters for the tree-building algorithm used by the aggregation engine 203 to aggregate paths in a tree. The configuration object facilitates managing the complexity and variety of paths that may be seen in the tree aggregation process. Example configuration parameters exposed by the configuration object may include a depth limit, a start index, a node limit, a prune limit, a prune target, a prune depth, maximum nodes in memory, etc. The values of the configuration parameters may be changeable. For example, user input may update the default values of the configuration parameters.

The configuration parameter 'depth limit' defines how deep to aggregate the tree. For example, if depth limit is set to one, the aggregation engine 203 returns a tree with only the root nodes. In another example, if the depth limit is set to five, the aggregation engine 203 returns a tree that is 5 nodes deep. The configuration parameter 'start index' defines which index to start reading the path from. For example, the aggregation engine 203 may use start index to skip some parts of the beginning of the path depending on how the data is modeled. The configuration parameter 'node limit' defines the number of nodes to include in the tree returned from executing the query. If no value is specified for either the node limit or the depth limit, the aggregation engine 203 uses a default node limit (e.g., 10,000). The configuration parameter 'prune limit' may instruct the aggregation engine 203 to prune the tree down to the number of nodes specified by the configuration parameter 'prune target' when a threshold number of nodes as defined by prune limit is met or exceeded. For example, the threshold value of prune limit may be set at 50,000, which is five times the default node limit. The configuration parameter 'prune target' defines the number of nodes to which the tree is to be pruned down. For example, the threshold value of prune target may be set at 20,000, which is two times the default node limit. When the tree grows to satisfy the prune limit (e.g., 50,000 nodes), the aggregation engine 203 prunes the tree down to the prune target (e.g., 20,000 nodes). Subsequently, the aggregation engine 203 may grow the tree from the prune target (e.g., 20,000 nodes) by adding paths using the scanned data from the data segments and again the aggregation engine 203 may prune the tree when the number of nodes in the tree grow to satisfy the prune limit (e.g., 50,000 nodes). At the end of processing, in some implementations, the aggregation engine 203 may prune the tree down to the node limit (e.g., 10,000) and return the tree as a final result. The aggregation engine 203 performs this iterative pruning of the tree in order to reduce the generation of 'catch all' buckets in the nodes of the tree which is described below.

The configuration parameter 'prune depth' defines a minimum floor below which the aggregation engine 203 may not prune down the tree. This may be necessary because, in some instances, a best attempt at pruning can result in a tree with zero branches. Prune depth protects from that undesired result happening by instructing the aggregation engine 203 to not prune the tree at this depth or 'lower' (i.e., closer to the root). For example, when prune depth is set to one, the aggregation engine 203 may not prune the root nodes in the tree. The configuration parameter 'maximum nodes in memory' sets a threshold limit on the tree size at which point the aggregation engine 203 may stop the tree building process and fail the query. This is necessary because prune depth takes ultimate precedence over the pruning algorithm used by the aggregation engine 203, meaning that even with node limit set aggressively to 100, for example, if there are more than 100 nodes that exist in the tree inside of prune depth (e.g., 10), the tree may include more than 100 nodes. For example, with a prune depth value of 1 and the value of maximum nodes in memory set to 100,000, the aggregation engine 203 may grow the tree up to 100,000 root nodes. If the tree grows to more than 100,000 root nodes, the aggregation engine 203 may discard the tree aggregation process itself rather than apply extra memory pressure and increase the instability of the system as a whole.

As each computing device in the cluster does its own local computation and starts aggregating its local representation of a tree for one or more data segments based on processing the query, the aggregation engine 203 checks the tree against the configuration parameters every time a path is added to the tree to determine whether the threshold values specified for different configuration parameters are satisfied. In some implementations, an instance of the aggregation engine 203 on each computing device in the cluster performs a pruning on its local representation of the tree to keep it at a manageable size. The aggregation engine 203 performs the pruning in an iterative fashion to keep the largest nodes in the tree while moving the smaller nodes into a 'catchall' bucket of its parent nodes. Each parent node in the tree carries both edges to its children and a 'catchall' weight which is an 'other' bucket. The catchall bucket of a parent node is not a child node. It is used to capture the full 'weight' of the branches emerging out of the parent node in the event those branches connecting to corresponding child nodes are pruned.

The aggregation engine 203 determines whether a current number of nodes in the tree satisfy the prune limit (e.g., 50,000) responsive to a new path being added to the tree. If the current number of nodes in the tree satisfy the prune limit, the aggregation engine 203 invokes pruning the tree down to make the current number of nodes satisfy the prune target (e.g., 20,000). The aggregation engine 203 starts pruning the tree from the deepest part and lowest weighted part of the tree. In some implementations, the aggregation engine 203 sorts the current number of nodes by their corresponding weight and level of depth in the tree. For those nodes that are lowest in weight and deepest in the tree, the aggregation engine 203 pushes them into a catchall bucket of their parent nodes. For example, the aggregation engine 203 may identify a child node that is lowest in weight and deepest in level of depth in the tree. The aggregation engine 203 prunes the child node from the tree by rolling up all of its weight into the catchall bucket of its parent node. The aggregation engine 203 repeats the above steps of pruning process until the current number of nodes in the tree satisfy the prune target. Subsequent to pruning the tree down to the prune target, the aggregation engine 203 may aggregate paths into the tree using scanned data from the data segments and again the aggregation engine 203 may prune the tree when the number of nodes in the tree grow to satisfy the prune limit. At the end of processing, in some implementations, the aggregation engine 203 prunes the tree down to the node limit (e.g., 10,000) and returns the tree as a final result. The aggregation engine 203 performs this iterative pruning of the tree in order to reduce the generation of 'catch all' buckets in the nodes of the tree.

In some implementations, the aggregation engine 203 generates a response to the query that is a flattened representation of the tree. For example, the flattened representation of the tree may include several arrays, such as 'dictionary' (e.g., array of string values), 'dictionary values' (e.g., array of indexes into the dictionary values), 'node weights' (e.g., array of 64-bit weight aggregates), 'catchall weights' (e.g., array of 1-shifted 64-bit weight aggregates), 'number of children' (e.g., array of integers representing number of children), 'children IDs' (array of integer indexes to flattened nodes), 'roots' (e.g., array of integer indexes to nodes), 'config' (e.g., JSON object with various configuration parameters), etc. The aggregation engine 203 stores the response in the tree data 222 of the data storage 243.

The 'dictionary values,' 'node weights,' 'catchall weights,' and 'number of children' in the response are all equal-length arrays. The length of these arrays is equivalent to the number of nodes in the tree. For example, if 'dictionary values' is of length 25, then 'node weights,' 'catchall weights,' and 'number of children' are also of length 25 and the tree has 25 nodes in it. The 'dictionary' in the response includes all of the node names. The length of 'dictionary' may not be longer than the length of 'dictionary values' but usually be shorter as most paths of this nature have a significant number of values that repeat in different positions. The sum of the length of 'children IDs' and 'roots' is equivalent to the number of nodes in the tree. This is because all nodes are either a root or a child of another node. Additionally, a child cannot have multiple parents. The flattened representation is used because it is relatively optimal for serialization. The query application 103 may convert the flattened representation to an in-memory tree for interaction and visualization.

Figure 3:
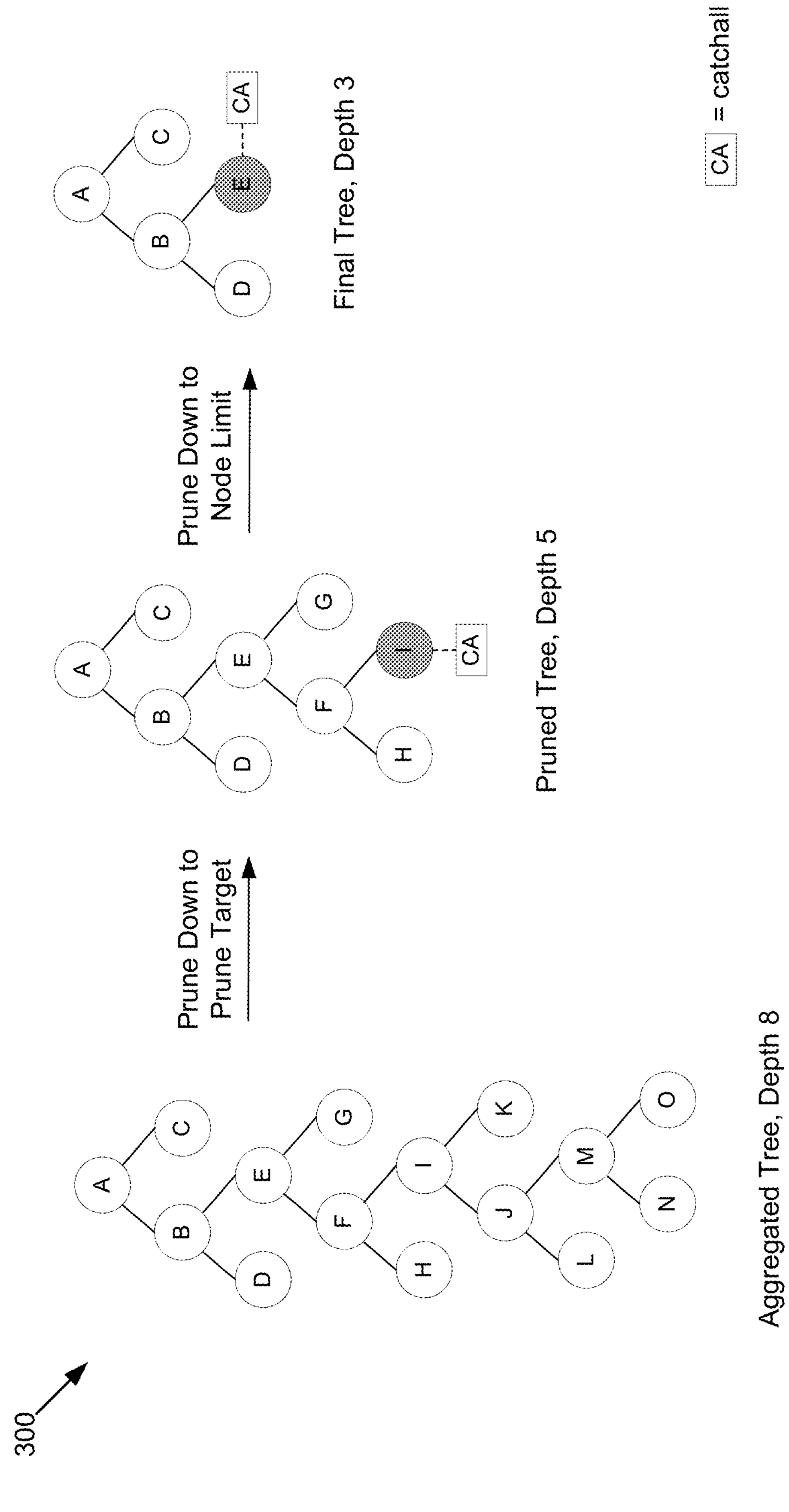
FIG. 3 shows a graphical representation illustrating an implementation of an example pruning process during tree aggregation.

Referring to FIG. 3, the graphical representation illustrates an implementation of an example pruning process 300 during tree aggregation. In the example pruning process 300 of FIG. 3, consider that the prune limit is set at 15, the prune target is set at nine, and the node limit is set at five, for example. The aggregation engine 203 aggregates a tree to a level of depth at eight (8 nodes deep) based on processing a query. The aggregation engine 203 determines that the current number of nodes in the aggregated tree satisfy the prune limit (e.g., 15). In response to that determination, the aggregation engine 203 prunes the number of nodes in the aggregated tree down to the prune target (e.g., 9). The pruned tree has a level of depth at five (5 nodes deep). The catchall of node ‘I’ in the pruned tree includes the weight of all the pruned nodes. The aggregation engine 203 may add new paths to the pruned tree based on scanned data to continue the tree aggregation and again prune the tree when the number of nodes in the tree grow to satisfy the prune limit. At the end of processing (e.g., when there are no data segments to scan for aggregating into the tree), in some implementations, the aggregation engine 203 may prune the tree down to the node limit (e.g., 5) and return the final tree having a level of depth at 3 (e.g., 3 nodes deep). The catchall of node ‘E’ in the final tree includes the weight of all the pruned nodes.

The merging engine 205 may include software and/or logic to provide the functionality for merging the plurality of trees into a final aggregated tree. In some implementations, each parallel computing device may send their local representation of the tree to an instance of the merging engine 205 on a master computing device in the cluster for merging. Due to the distributed nature of aggregating and pruning of the trees occurring across the cluster of computing devices in parallel, it is possible that a first computing device may determine a child node in its tree is small and prune the branch to the child node into a catchall bucket of the corresponding parent node while a second computing device may determine the same child node in its tree is large and preserve the branch. The merging engine 205 is configured to identify and reconcile such differences during the merging of the trees. For example, when the trees in above scenario are processed to be merged, the merging engine 205 also prunes the branch from the result of the second computing device into a catchall bucket of the parent node in the merged tree to maintain consistency and to provide the ‘most’ correct answer possible for the branch. In some implementations, the merging engine 205 checks whether the number of nodes in the merged tree is greater than the node limit specified in the second set of criteria of the query. If the number of nodes in the merged tree is greater than the node limit, the merging engine 205 prunes the merged tree down to the node limit (e.g., 10,000) and returns the tree as a final result.

Figure 4:
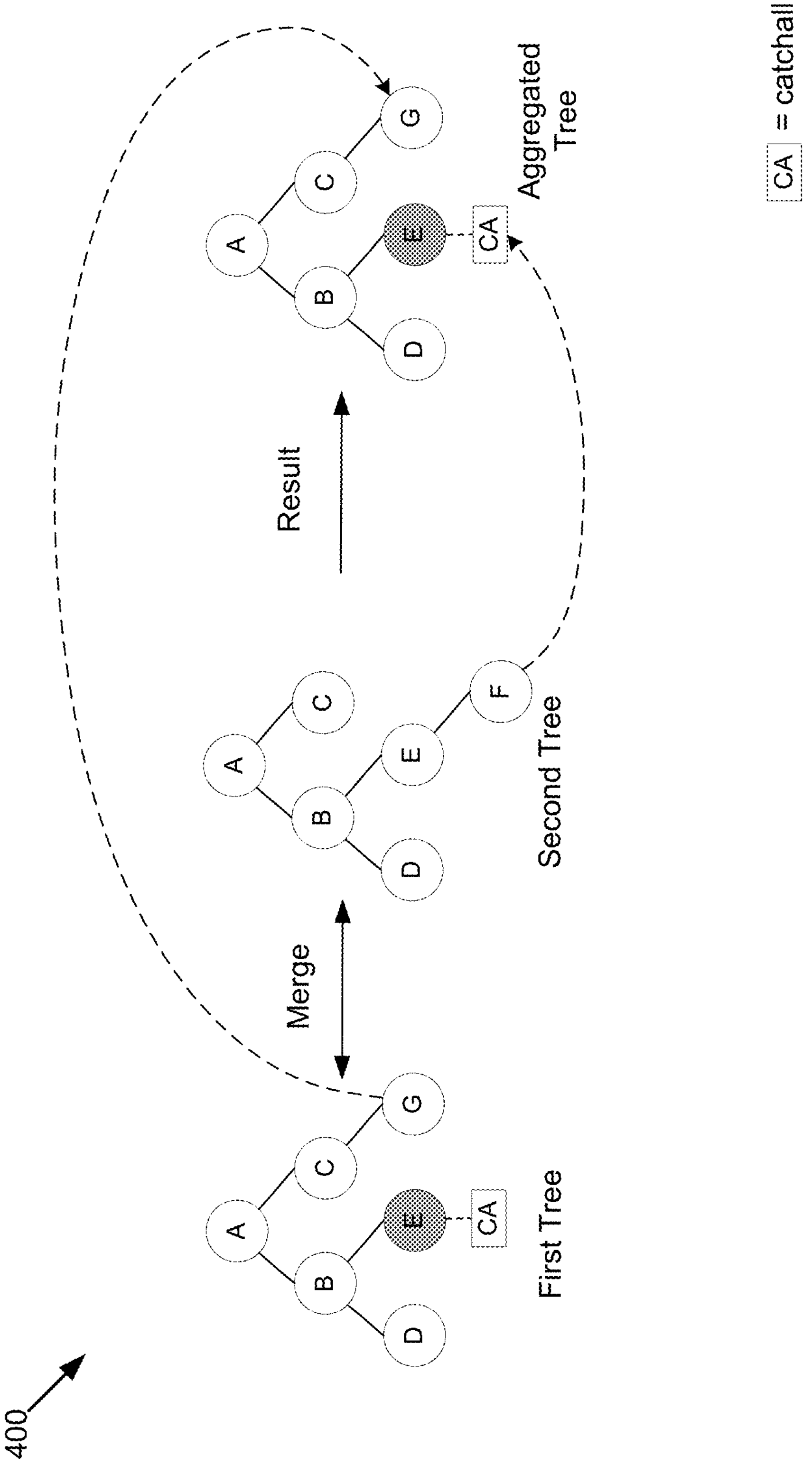
FIG. 4 shows a graphical representation illustrating an implementation of an example merging process during tree aggregation.

Referring to FIG. 4, the graphical representation illustrates an implementation of an example merging process 400 during tree aggregation. In the example merging process 400 of FIG. 4, the merging engine 205 may receive a first tree and a second tree from a first computing device and a second computing device of the cluster of distributed computing devices respectively. The merging engine 205 performs a traversal of the first tree and the second tree from a corresponding node. For example, the corresponding node may be a root node ‘A’ present in both the trees. In some implementations, the merging engine 205 performs the traversal of the trees one level of depth at a time. The merging engine 205 determines whether there are corresponding nodes identified in the first and the second trees having a same name responsive to performing the traversal. If there are corresponding nodes having a same name, the merging engine 205 merges the corresponding nodes and adds up their weights in the aggregated tree. For example, nodes ‘A,’ ‘B,’ ‘C,’ ‘D, and ‘E’ in the first tree and the second tree are merged and their weights added up in the aggregated tree.

If there is an absence of corresponding nodes having the same name, the merging engine 205 determines whether that is because there is a child node present in one tree that is absent from a corresponding parent node in the other tree. For example, the merging engine 205 determines that parent node ‘E’ in the second tree has a child node ‘F’ that is absent from the corresponding parent node ‘E’ in the first tree. In another example, the merging engine 205 determines that a parent node ‘C’ in the first tree has a child node ‘G’ that is absent from the corresponding parent node ‘C’ in the second tree.

If there is a child node present in one tree that is absent from a corresponding parent node in the other tree, the merging engine 205 determines whether a catchall bucket of the corresponding parent node in the other tree is non-empty. If the catchall bucket of the corresponding parent node in the other tree is non-empty, the merging engine 205 rolls the weight of the child node from one tree into the catchall bucket of the corresponding parent node in the other tree. For example, the merging engine 205 determines that node ‘E’ in the first tree has a catchall bucket that is non-empty and rolls the weight of the child node ‘F’ in the second tree into the catchall bucket of node ‘E’ in the aggregated tree.

If the catchall bucket of the corresponding parent node in the other tree is empty, the merging engine 205 adds the child node from one tree to the corresponding parent node in the other tree. For example, the merging engine 205 determines that node ‘C’ in the second tree has an empty catchall and copies the child node ‘G’ from the first tree to add it to the parent node ‘C’ in the aggregated tree as a new child. The merging engine 205 performs this action because the aggregation of the path to child node ‘G’ is accurate at that point.

The primary assumption under which the aggregation engine 203/merging engine 205 function in the query application 103 is that if a node exists in a tree as a child, its weights are considered to be correct. In other words, the pruning algorithm used by the aggregation engine 203/merging engine 205 is conservative in its approach in that if there is a chance that it does not have the correct weights for a child node, the pruning algorithm moves the child node into the catchall bucket of the parent node. Due to the distributed nature of pruning and later merging of the trees, it is possible that a largest contributor to a specific parent node ends up forced into the catchall bucket of the parent node in the tree by the pruning algorithm. This may have been detrimental if not for the capability to query the catchall bucket. The visualization engine 201 facilitates iterative querying of the catchall bucket in multiple, subsequent queries including further refining filter sets in order to expand the catchall bucket for subsequent visualization and analysis. For example, the visualization engine 201 may issue a subsequent query specifying the path with a prefix to the parent node to expand that catchall bucket of the parent node. Essentially, a full ‘weight’ of the branch is captured in the catchall bucket of the parent node. The visualization engine 201 exposes, via a user interface of the visualization interface server 101, for a user to select the catchall bucket parts in the visualization of the rendered tree. In response to receiving a selection of a catchall bucket, the visualization engine 201 may issue a subsequent query to the aggregation engine 203/merging engine 205 to build a new tree starting from the parent node associated with the catchall bucket. This subsequent query does not condense the branch into the catchall as it is a more specify query. For each iterative refinement and filtering in the visualization, the queries issued by the visualization engine 210 continue to fetch less data and return a corresponding tree at a much faster rate.

In some implementations, the visualization engine 201 may automatically determine multiple queries in association with rendering the visualization and send the queries to the aggregation engine 203 and merging engine 205 for processing as described herein. For example, the visualization engine 201 may iteratively and preemptively build out the full tree without receiving user interactions. In some implementations, the visualization engine 201 may automatically select a threshold number of largest nodes in association with rendering the visualization for data exploration and analysis at regular time intervals. For example, the visualization engine 201 may automatically select five largest catchall buckets every two minutes, issue a query for each of the five catchall buckets, and render the visualization of the aggregated trees returned in response to processing the query. In some implementations, the visualization engine 201 may continue to automatically determine and issue multiple queries in association with rendering the visualization until all catchall buckets in the visualization are fully expanded. In some implementations, the visualization engine 201 may perform the automatic querying in association with rendering the visualization in the background when the computing resources are available and otherwise not engaged.

The user interface engine 207 may include software and/or logic for providing user interfaces to a user. In some implementations, the user interface engine 207 receives instructions from one or more of the components 201, 203, and 205, generates a user interface according to the instructions, and transmits the user interface for display on the client device 115 as described with reference to FIGS. 5A-5B. In some implementations, the user interface engine 207 sends graphical user interface data to an application (e.g., a browser) in the client device 115 via the communication unit 241 causing the application to display the data as a graphical user interface.

FIGS. 5A-5B show graphical representation of example user interfaces 500 and 550 depicting a flame graph visualization for data exploration and analysis. In FIG. 5A, the user interface 500 may be a visualization interface providing an interactive flame graph visualization that allows a user to drill-down and analyze data through user interactions, such as drag-and-drop, point-and-click, one-click, double-click, scroll, resize, expand, collapse, etc. The user interface 500 includes a first field 501 for selecting a database to query and explore in the flame graph visualization, a second field 503 to select the depth limit for tree aggregation, a third field 505 for selecting a node limit for tree aggregation, a fourth field 507 for providing a filter (e.g., SQL filter) to define the rows of data to include in the computation of the query, a fifth field 509 to select the path column, and six field 511 to select the weight column. The user interface 500 displays the flame graph visualization of an aggregated tree for visualizing stack traces. The flame graph visualization shows an arrangement of rectangle boxes (e.g., graphical elements) in different layers, each box representing a function in the call stack and user selectable for data exploration and analysis. The flame graph visualization uses warm colors picked at random to display the boxes. The y-axis shows the hierarchy of items. The x-axis spans the stack profile population. A width of the box is associated with the count or weight of the function in the call stack. The top layer shows the catchall style buckets 517 and the layer beneath the catchall buckets are the corresponding parent nodes in the hierarchy. On layer 3 from the bottom of the flame graph visualization, the largest item under parent 'node_modules' 513 is child node '@babel' 515. The user may select this item for a further drill down into the data. In FIG. 5B, the user interface 550 shows another flame graph visualization for data exploration and analysis. This flame graph visualization is updated in response to receiving the user selection of child node '@babel' 515 in FIG. 5A. The updated flame graph visualization shows an expanded view of data under the node '@babel' 515.

Figure 6:
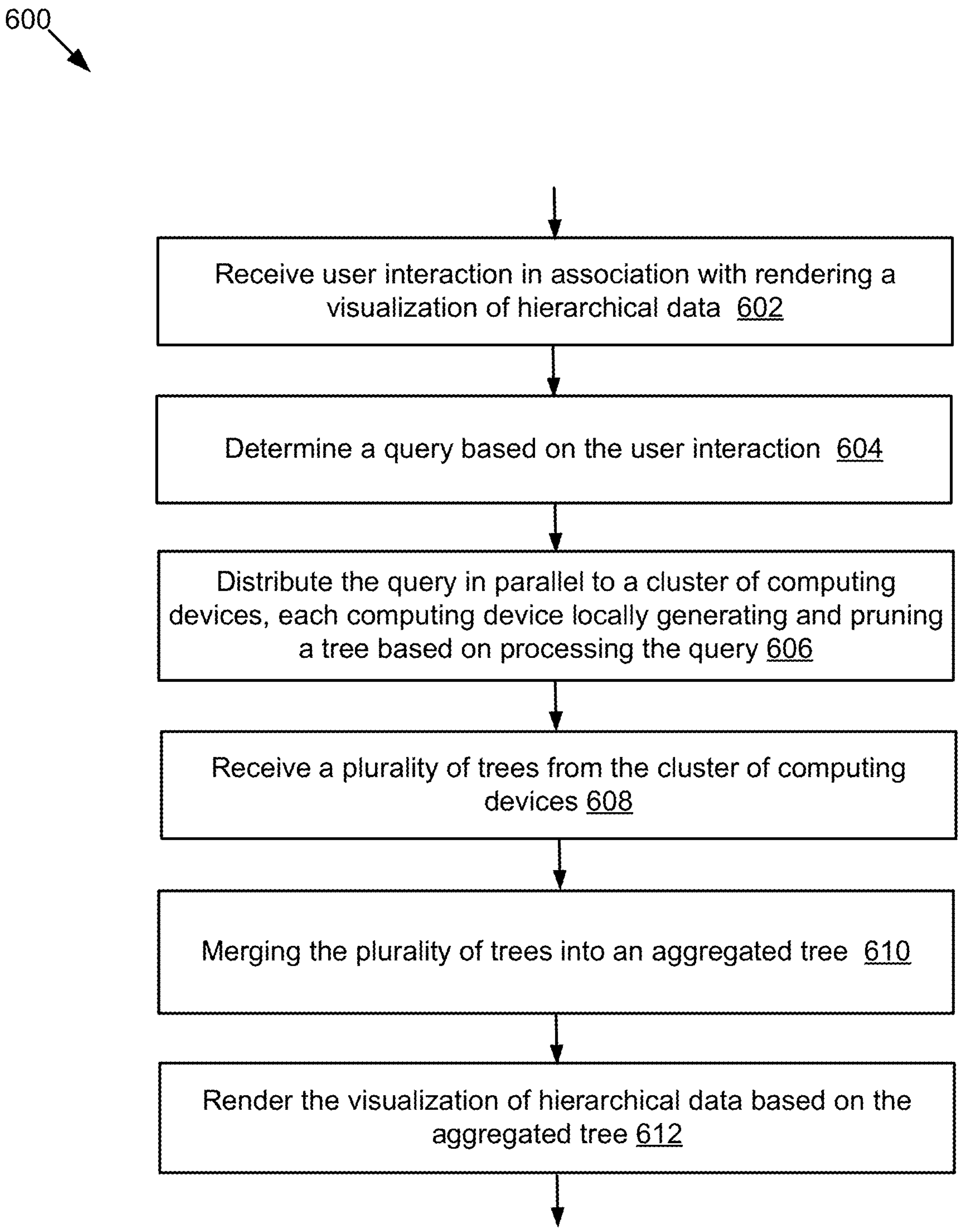
FIG. 6 is a flow diagram illustrating one implementation of an example method for rendering a visualization of an aggregated tree.

FIG. 6 is a flow diagram illustrating one implementation of an example method 600 for rendering a visualization of an aggregated tree. The method 600 may be performed by a system of one or more computing devices in one or more locations, including, for example, the visualization interface server 101, the analytics database server 120, and the client device 115 of FIG. 1.

At 602, the visualization engine 201 receives user interaction in association with rendering a visualization of hierarchical data. At 604, the visualization engine 201 determines a query based on the user interaction. At 606, the aggregation engine 203 distributes the query in parallel to a cluster of computing devices, each computing device in the cluster locally generating and pruning a tree based on processing the query. At 608, the merging engine 205 receives a plurality of trees from the cluster of computing devices. At 610, the merging engine 205 merges the plurality of trees into an aggregated tree. At 612, the visualization engine 201 renders the visualization of hierarchical data based on the aggregated tree.

Figure 7:
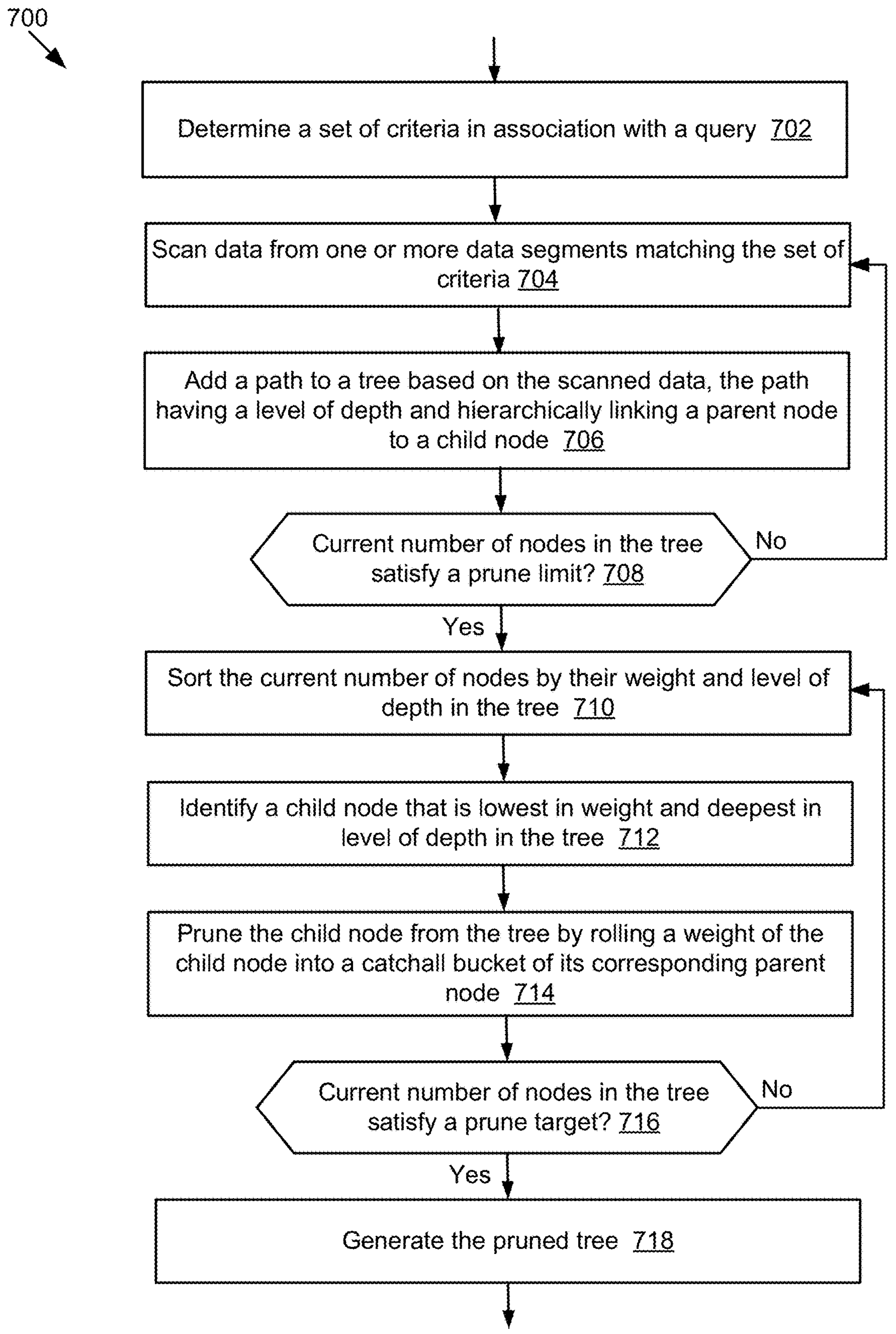
FIG. 7 is a flow diagram illustrating one implementation of an example method for pruning a tree.

FIG. 7 is a flow diagram illustrating one implementation of an example method 700 for pruning a tree. The method 700 may be performed by a system of one or more computing devices in one or more locations, including, for example, the visualization interface server 101, the analytics database server 120, and the client device 115 of FIG. 1.

At 702, the aggregation engine 203 determines a set of criteria in association with a query. At 704, the aggregation engine 203 scans data from one or more data segments matching the set of criteria. At 706, the aggregation engine 203 adds a path to a tree based on the scanned data, the path having a level of depth and hierarchically linking a parent node to a child node. At 708, the aggregation engine 203 determines whether a current number of nodes in the tree satisfies a prune limit. If the current number of nodes in the tree do not satisfy the prune limit, the method 700 loops back to step 704 again. If the current number of nodes in the tree satisfy the prune limit, at 710, the aggregation engine 203 sorts the current number of nodes by their weight and level of depth in the tree. At 712, the aggregation engine 203 identifies a child node that is lowest in weight and deepest in level of depth in the tree. At 714, the aggregation engine 203 prunes the child node from the tree by rolling a weight of the child node into a catchall bucket of its corresponding parent node. At 716, the aggregation engine 203 checks whether the current number of nodes in the tree satisfy the prune target. If the current number of nodes in the tree do not satisfy the prune target, the method 700 loops back to step 710 again. If the current number of nodes in the tree satisfies the prune target, at 718, the aggregation engine 203 generates the pruned tree.

Figure 8:
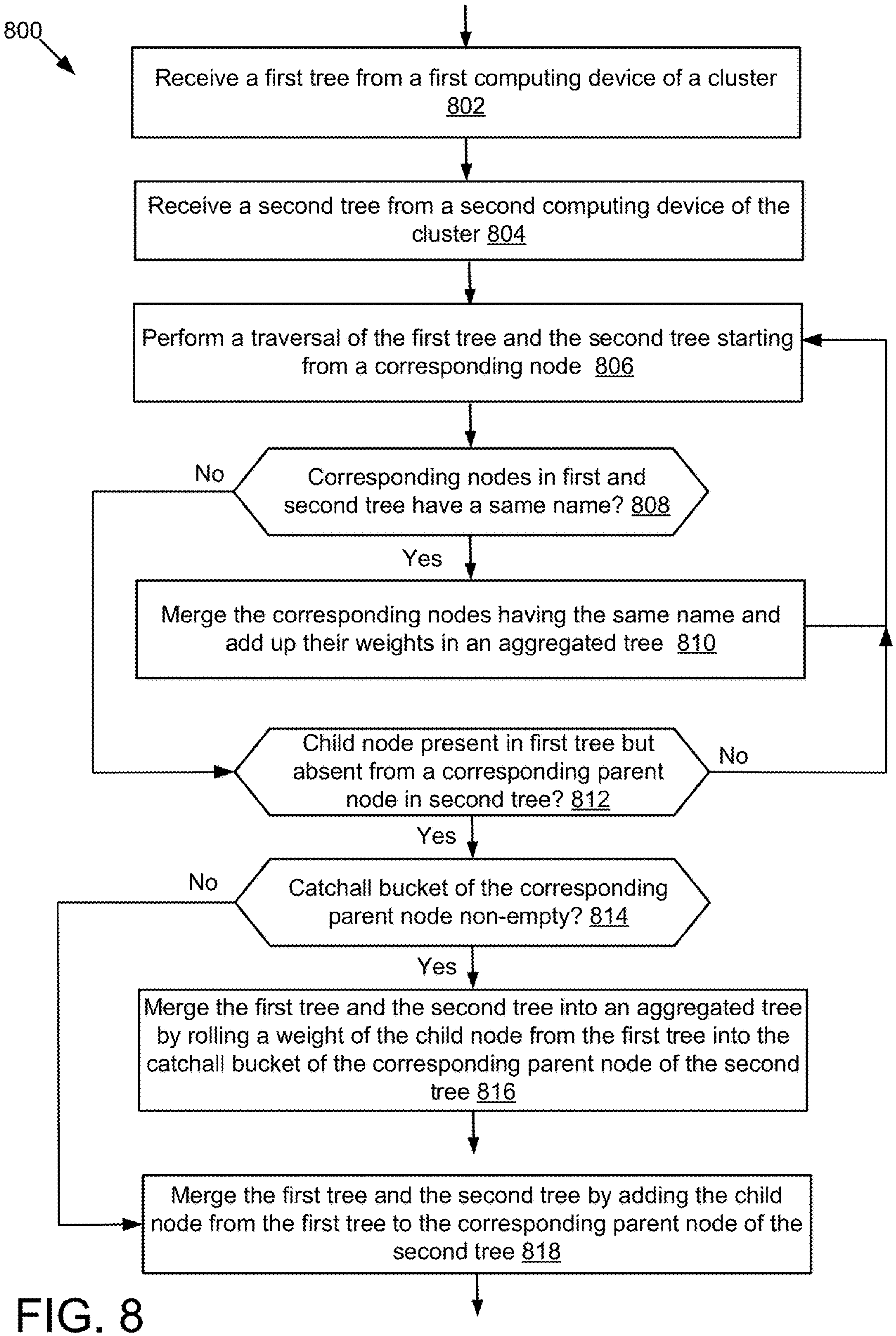
FIG. 8 is a flow diagram illustrating one implementation of an example method for merging a plurality of trees.

FIG. 8 is a flow diagram illustrating one implementation of an example method 800 for merging a plurality of trees. The method 800 may be performed by a system of one or more computing devices in one or more locations, including, for example, the visualization interface server 101, the analytics database server 120, and the client device 115 of FIG. 1.

At 802, the merging engine 205 receives a first tree from a first computing device of a cluster of computing devices. At 804, the merging engine 205 receives a second tree from a second computing device of the cluster of computing devices. At 806, the merging engine 205 performs a traversal of the first tree and the second tree starting from a corresponding node. For example, the corresponding node may be a root node in beginning of the traversal. At 808, the merging engine 205 determines whether there are corresponding nodes in the first and the second tree having a same name. If there are corresponding nodes having a same name, at 810, the merging engine 205 merges the corresponding nodes having the same name and adds up their weights in an aggregated tree.

If there is an absence of corresponding nodes having the same name, at 812, the merging engine 205 determines whether there is a child node present in the first tree but absent from a corresponding parent node in the second tree. If there is no child node present in the first tree but absent from a corresponding parent node in the second tree, the method 800 loops back to step 806 to continue the traversal from a corresponding node. If there is a child node present in the first tree but absent from a corresponding parent node in the second tree, at 814, the merging engine 205 determines whether a catchall bucket of the corresponding parent node in the second tree is non-empty. If the catchall bucket of the corresponding parent node in the second tree is non-empty, at 816, the merging engine 205 merges the first tree and the second tree into an aggregated tree by rolling a weight of the child node from the first tree into the catchall bucket of the corresponding parent node of the second tree. If the catchall bucket of the corresponding parent node in the second tree is empty, at 818, the merging engine 205 merges the first tree and the second tree by adding the child node from the first tree to the corresponding parent node of the second tree.

A system and method for implementing an iterative query mechanism to facilitate distributed aggregation and interactive visualization of data has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

receiving a user interaction in a series of user interactions in association with rendering a visualization of hierarchical data, wherein the series of user interactions includes a selection of a catchall bucket in the visualization to issue a subsequent query corresponding to one or more pruned nodes in the catchall bucket;

determining a query based on the user interaction;

distributing the query to a cluster of computing devices, wherein each computing device in the cluster locally processes the query against one or more data segments of a database comprising the hierarchical data to iteratively build a tree in parallel by pruning one or more nodes from the tree into a catchall bucket of their corresponding parent nodes;

responsive to distributing the query, receiving a plurality of trees from the cluster of computing devices;

merging the plurality of trees into an aggregated tree; and rendering the visualization of hierarchical data based on the aggregated tree.

2. The computer-implemented method of claim 1, wherein distributing the query to the cluster of computing devices further comprises:

determining a first set of criteria in association with the query;

identifying the one or more data segments of the database storing the hierarchical data that match the first set of criteria;

identifying the cluster of computing devices serving the one or more data segments for processing the query; and distributing the query to the cluster of computing devices.

3. The computer-implemented method of claim 2, wherein each computing device in the cluster locally processes the query by:

determining a second set of criteria in association with the query;

scanning data from the one or more data segments that match the second set of criteria; and adding a path to the tree based on the scanned data, the path having a level of depth and hierarchically linking a parent node to a child node in the tree.

4. The computer-implemented method of claim 3, further comprising:

identifying, from the second set of criteria, a first configuration parameter specifying a prune limit and a second configuration parameter specifying a prune target in association with pruning the tree;

responsive to adding the path to the tree based on the scanned data, determining whether a current number of nodes in the tree satisfy the first configuration parameter specifying the prune limit; and responsive to determining that the current number of nodes in the tree satisfy the first configuration parameter specifying the prune limit, pruning down the current number of nodes in the tree to satisfy the second configuration parameter specifying the prune target.

5. The computer-implemented method of claim 4, wherein pruning down the current number of nodes in the tree to satisfy the second configuration parameter specifying the prune target comprises:

sorting the current number of nodes by their corresponding weight and level of depth in the tree;

identifying a child node that is lowest in weight and deepest in level of depth in the tree;

pruning the child node from the tree by rolling a weight of the child node into a catchall bucket of its corresponding parent node; and repeating the sorting, the identifying, and the pruning until the current number of nodes in the tree satisfy the second configuration parameter specifying the prune target.

6. The computer-implemented method of claim 1, wherein merging the plurality of trees into the aggregated tree further comprises:

receiving, from a first computing device of the cluster of computing devices, a first tree;

receiving, from a second computing device of the cluster of computing devices, a second tree;

performing a traversal of the first tree and the second tree starting from a corresponding root node;

responsive to performing the traversal of the first tree and the second tree from the corresponding root node, determining whether there are corresponding nodes in the first tree and the second tree having a same name; and responsive to determining that there are corresponding nodes in the first tree and the second tree having the same name, merging the corresponding nodes and adding up their corresponding weights in the aggregated tree.

7. The computer-implemented method of claim 6, further comprising:

responsive to determining that there is an absence of corresponding nodes in the first tree and the second tree having the same name, determining whether there is a child node present in the first tree that is absent from a corresponding parent node in the second tree;

responsive to determining that there is the child node present in the first tree that is absent from the corresponding parent node in the second tree, determining whether a catchall bucket of the corresponding parent node in the second tree is non-empty; and responsive to determining that the catchall bucket of the corresponding parent node in the second tree is non-empty, merging the corresponding parent node and rolling a weight of the child node from the first tree into the catchall bucket of the corresponding parent node in the aggregated tree.

8. The computer-implemented method of claim 7, further comprising:

responsive to determining that the catchall bucket of the corresponding parent node in the second tree is empty, merging the corresponding parent node and adding the child node from the first tree to the corresponding parent node in the aggregated tree.

9. The computer-implemented method of claim 1, wherein receiving the user interaction in association with rendering the visualization of hierarchical data includes receiving, in the visualization, a selection of a graphical element corresponding to one of a node and a catchall bucket.

10. The computer-implemented method of claim 1, wherein rendering the visualization of hierarchical data based on the aggregated tree further comprises:

automatically selecting a threshold number of nodes without user interaction;

determining a query in association with automatically selecting each node in the threshold number of nodes; and distributing the query in parallel to the cluster of computing devices for processing.

11. The computer-implemented method of claim 1, wherein the aggregated tree is a multi-rooted tree.

12. The computer-implemented method of claim 1, wherein the visualization is one from a group of a flame graph, a flame chart, an icicle chart, and a sunburst layout.

13. A system comprising:

one or more hardware processors; and a non-transitory memory, the non-transitory memory storing instructions, which when executed cause the one or more hardware processors to:

receive a user interaction in a series of user interactions in association with rendering a visualization of hierarchical data, wherein the series of user interactions includes a selection of a catchall bucket in the visualization to issue a subsequent query corresponding to one or more pruned nodes in the catchall bucket;

determine a query based on the user interaction;

distribute the query to a cluster of computing devices, wherein each computing device in the cluster locally processes the query against one or more data segments of a database comprising the hierarchical data to iteratively build a tree in parallel by pruning one or more nodes from the tree into a catchall bucket of their corresponding parent nodes;

receive a plurality of trees from the cluster of computing devices responsive to distributing the query;

merge the plurality of trees into an aggregated tree; and render the visualization of hierarchical data based on the aggregated tree.

14. The system of claim 13, wherein to distribute the query to the cluster of computing devices, the instructions further cause the one or more hardware processors to:

determine a first set of criteria in association with the query;

identify the one or more data segments of the database storing the hierarchical data that match the first set of criteria;

identify the cluster of computing devices serving the one or more data segments for processing the query; and distribute the query to the cluster of computing devices.

15. The system of claim 14, wherein for each computing device in the cluster to locally process the query, the instructions further cause the one or more hardware processors to:

determine a second set of criteria in association with the query;

scan data from the one or more data segments that match the second set of criteria; and add a path to the tree based on the scanned data, the path having a level of depth and hierarchically linking a parent node to a child node in the tree.

16. The system of claim 15, wherein the instructions further cause the one or more hardware processors to:

identify, from the second set of criteria, a first configuration parameter specifying a prune limit and a second configuration parameter specifying a prune target in association with pruning the tree;

determine whether a current number of nodes in the tree satisfy the first configuration parameter specifying the prune limit responsive to adding the path to the tree based on the scanned data; and prune down the current number of nodes in the tree to satisfy the second configuration parameter specifying the prune target responsive to determining that the current number of nodes in the tree satisfy the first configuration parameter specifying the prune limit.

17. The system of claim 16, wherein to prune down the current number of nodes in the tree to satisfy the second configuration parameter specifying the prune target, the instructions further cause the one or more hardware processors to:

sort the current number of nodes by their corresponding weight and level of depth in the tree;

identify a child node that is lowest in weight and deepest in level of depth in the tree;

prune the child node from the tree by rolling a weight of the child node into a catchall bucket of its corresponding parent node; and repeat sorting, identifying, and pruning until the current number of nodes in the tree satisfy the second configuration parameter specifying the prune target.

18. The system of claim 13, wherein to merge the plurality of trees into the aggregated tree, the instructions further cause the one or more hardware processors to:

receive, from a first computing device of the cluster of computing devices, a first tree;

receive, from a second computing device of the cluster of computing devices, a second tree;

perform a traversal of the first tree and the second tree starting from a corresponding root node;

determine whether there are corresponding nodes in the first tree and the second tree having a same name responsive to performing the traversal of the first tree and the second tree from the corresponding root node; and merge the corresponding nodes and adding up their corresponding weights in the aggregated tree responsive to determining that there are corresponding nodes in the first tree and the second tree having the same name.

19. The system of claim 18, wherein the instructions further cause the one or more hardware processors to:

determine whether there is a child node present in the first tree that is absent from a corresponding parent node in the second tree responsive to determining that there is an absence of corresponding nodes in the first tree and the second tree having the same name;

determine whether a catchall bucket of the corresponding parent node in the second tree is non-empty responsive to determining that there is the child node present in the first tree that is absent from the corresponding parent node in the second tree; and merge the corresponding parent node and roll a weight of the child node from the first tree into the catchall bucket of the corresponding parent node in the aggregated tree responsive to determining that the catchall bucket of the corresponding parent node in the second tree is non-empty.

20. The system of claim 19, wherein the instructions further cause the one or more hardware processors to:

merge the corresponding parent node and add the child node from the first tree to the corresponding parent node in the aggregated tree responsive to determining that the catchall bucket of the corresponding parent node in the second tree is empty.

* * * * *